US011755923B2

(12) United States Patent
Sohrabi Araghi et al.

(10) Patent No.: US 11,755,923 B2
(45) Date of Patent: Sep. 12, 2023

(54) GUIDED PLAN RECOGNITION

(71) Applicant: International Business Machines Corporation, Armonk, NY (US)

(72) Inventors: Shirin Sohrabi Araghi, Briarcliff Manor, NY (US); Michael Katz, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 1184 days.

(21) Appl. No.: 16/205,212

(22) Filed: Nov. 29, 2018

(65) Prior Publication Data
US 2020/0175382 A1 Jun. 4, 2020

(51) Int. Cl.
*G06N 5/02* (2023.01)
*G06F 11/34* (2006.01)
*G06F 21/56* (2013.01)
*G06F 11/30* (2006.01)
*G06Q 10/00* (2023.01)
*G06N 5/045* (2023.01)
(Continued)

(52) U.S. Cl.
CPC ........... *G06N 5/02* (2013.01); *G06F 11/3024* (2013.01); *G06F 11/3409* (2013.01); *G06F 21/56* (2013.01); *G06N 3/042* (2023.01); *G06N 5/04* (2013.01); *G06N 5/043* (2013.01); *G06N 5/045* (2013.01); *G06N 20/00* (2019.01); *G06Q 10/00* (2013.01); *G06F 2221/033* (2013.01)

(58) Field of Classification Search
CPC .......... G06N 5/02; G06N 3/0427; G06N 5/04; G06N 5/043; G06N 5/045; G06N 20/00; G06N 5/022; G06F 11/3024; G06F 11/3409; G06F 21/56; G06F 2221/033; G06F 21/566; G06F 21/552; G06Q 10/00
See application file for complete search history.

(56) References Cited

U.S. PATENT DOCUMENTS 7,146,348 B2    12/2006 Geib et al.
8,473,447 B2    6/2013 Yoon et al.
(Continued)

OTHER PUBLICATIONS

Katz and Sohrabi, Reshaping Diverse Planning, 2020, 34th AAAI Conference on Aritficial Intelligence, pp. 9892-9899.*
(Continued)

*Primary Examiner* — Arthur Duran
(74) *Attorney, Agent, or Firm* — Kurt Goudy; Otterstedt & Kammer PLLC

(57) ABSTRACT

Performance of a computer running a plan recognition application is improved by obtaining, with a user interface implemented on the computer, a specification of a plan recognition problem, including a plurality of candidate observations; formulating at least one planning problem, with the computer, based on the specification; solving the at least one planning problem, with the computer, to determine at least one plan. The at least one plan is post-processed, with the computer, to determine at least one of the candidate observations which should be selected to solve the plan recognition problem; and the plan recognition problem is solved, with the computer, using the at least one of the candidate observations which should be selected to solve the plan recognition problem. Less CPU time is typically required for the solution as compared to techniques without guidance for selecting the observations.

15 Claims, 7 Drawing Sheets

(51) Int. Cl.
  *G06N 20/00* (2019.01)
  *G06N 5/04* (2023.01)
  *G06N 3/042* (2023.01)
  *G06N 5/043* (2023.01)

(56) References Cited

U.S. PATENT DOCUMENTS

| | | | |
|---|---|---|---|
| 9,047,423 B2 | 6/2015 | Tesauro et al. | |
| 9,384,448 B2 | 7/2016 | Tu et al. | |
| 9,824,684 B2 | 11/2017 | Yu et al. | |
| 9,886,625 B2 | 2/2018 | Wnuk et al. | |
| 2006/0293838 A1 | 12/2006 | Yamamoto | |
| 2007/0094133 A1* | 4/2007 | Anandarao | G06Q 20/102 705/40 |
| 2007/0150427 A1 | 6/2007 | Geib et al. | |
| 2007/0226164 A1 | 9/2007 | Geib et al. | |
| 2007/0286071 A1* | 12/2007 | Cormode | H04L 43/16 370/229 |
| 2015/0339580 A1* | 11/2015 | Riabov | G16H 50/70 706/46 |
| 2015/0339582 A1* | 11/2015 | Riabov | G06F 7/523 706/11 |
| 2016/0098537 A1 | 4/2016 | Dettinger et al. | |
| 2016/0117602 A1* | 4/2016 | Hassanzadeh | G06F 16/285 706/11 |
| 2016/0292568 A1 | 10/2016 | Schaul et al. | |
| 2017/0147923 A1* | 5/2017 | Riabov | G06N 5/045 |
| 2018/0217908 A1 | 8/2018 | Riabov et al. | |
| 2018/0217909 A1 | 8/2018 | Riabov et al. | |
| 2018/0218266 A1 | 8/2018 | Halim et al. | |
| 2018/0218267 A1 | 8/2018 | Halim et al. | |
| 2018/0218299 A1 | 8/2018 | Chang et al. | |
| 2018/0218300 A1 | 8/2018 | Chang et al. | |
| 2018/0218472 A1 | 8/2018 | Riabov et al. | |
| 2019/0340525 A1* | 11/2019 | Katz | G06N 5/045 |

OTHER PUBLICATIONS

Mirsky et al.; "Sequential Plan Recognition", Proceedings of the 15th International Conference on Autonomous Agents and Multiagent Systems (AAMAS 2016), May 9-13, 2016, 7 pages.

Argenta et al.; "Multi-Agent Plan Recognition As Planning (MAPRAP)", Proceedings of the 8th International Conference on Agents and Artificial Intelligence (ICAART 2016)—vol. 2, pp. 141-148, 2016.

Avrahami-Zilberbrand et al.; "Fast And Complete Symbolic Plan Recognition: Allowing For Duration, Interleaved Execution, And Lossy Observations", Proc. of the AAAI Workshop on Modeling Others from Observations, MOO. 2005, 7 pages.

Banerjee et al.; "New Algorithms And Hardness Results For Multi-Agent Plan Recognition", GAPRec 2011, 24, 8 pages 2011.

Sohrabi, Shirin, et al. "An AI planning solution to scenario generation for enterprise risk management." AAAI, 2018, 8 pages.

Sohrabi S, et al., Plan Recognition as Planning Revisited. IJCAI Jul. 9, 2016 (pp. 3258-3264).

Ramirez, M. et al., Plan recognition as planning. In Proceedings of the 21st international joint conference on Artifical intelligence, IJCAI 2009 p. 1778-1783.

Haslum, P. et al., Diagnosis as planning: Two case studies, 8 pages, International Conference on Automated Planning and Scheduling 2011 proceedings.

Sohrabi, et al., "Diagnosis as Planning Revisited." Proceedings of the Twelfth International Conference on the Principles of Knowledge Representation and Reasoning, 11 pages, 2010.

Sohrabi, et al., "Preferred Explanations: Theory and Generation via Planning." Proceedings of the Twenty-Fifth AAAI Conference on Artificial Intelligence, 2011, pp. 261-267.

Vered, M., and Kaminka, Gal A. "Heuristic Online Goal Recognition in Continuous Domains." 2017 International Joint Conference on Artificial Intelligence, 8 pages, Sep. 28, 2017.

Shirin Sohrabi et al., AI-Based Scenario Planning for Risk Management, Jul. 27, 2018, pp. 1-5.

FreeMind—free mind mapping software, pp. 1-7, Downloaded From http://freemind.sourceforge.net/wiki/index.php/Main_Page, Nov. 19, 2018.

Sohrabi, S., Katz, M., Hassanzadeh, O., Udrea, O., & Feblowitz, M. D. (2018). IBM Scenario Planning Advisor: Plan Recognition as AI Planning in Practice. In IJCAI (pp. 5865-5867) Jul. 13-19, 2018, Stockholm, Sweden.

Sohrabi S, Udrea O, Riabov A. Hypothesis exploration for malware detection using planning. InProceedings of the AAAI Conference on Artificial Intelligence Jun. 30, 2013 (vol. 27, No. 1, pp. 883-889).

* cited by examiner

Scenario Planning Advisor — Country A     ○ PROFILE ○ ABOUT ○ LOGOUT

Generate Scenarios for Country A

You have selected the following key drivers; you can adjust the drivers by removing or adding drivers. To add, click the text box below – it will provide a dropdown of selections.

| 201 High inflation   X |

203 Able to analyze market and consumers better

205 Allows for a fair playing ground for all firms

207 Broadband internet becoming more widely available

209 Businesses or supplier disruption

211 Businesses struggling to conform to regulations

213 Businesses struggling to keep up with client demands

215 Call for new social programs

217 Capital controls (currency volatility)

*FIG. 4*
(PRIOR ART)

GUIDED PLAN RECOGNITION

BACKGROUND

The present invention relates to the electrical, electronic and computer arts, and more specifically, to artificial intelligence (AI) and the like.

Plan recognition is the problem of recognizing the goals and plans of an agent. It usually involves obtaining as the input the domain description and the set/sequence of observations in order to find out which of the goals or plans are more likely, given the observations (i.e., to find out which goal was being achieved and how).

The observations are often given in sets or sequence(s) and are assumed to be given without providing any guidance to the users. This may result in "unexpected" outcome(s), because the selected observation(s) cannot be explained by the system (e.g., they are inconsistent or incompatible with each other).

SUMMARY

Principles of the invention provide techniques for guided plan recognition. In one aspect, an exemplary method for improving the performance of a computer running a plan recognition application includes the step of obtaining, with a user interface implemented on the computer, a specification of a plan recognition problem, including a plurality of candidate observations; formulating at least one planning problem, with the computer, based on the specification; solving the at least one planning problem, with the computer, to determine at least one plan; post-processing the at least one plan, with the computer, to determine at least one of the candidate observations which should be selected to solve the plan recognition problem; and solving the plan recognition problem, with the computer, using the at least one of the candidate observations which should be selected to solve the plan recognition problem.

In another aspect, an exemplary computer, which runs a plan recognition application, includes a memory; at least one processor, coupled to the memory; and a non-transitory computer readable medium including computer executable instructions which when loaded into the memory configure the at least one processor to be operative to perform a method for improving the performance of the computer, as described just above.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

improved performance of AI plan recognition systems by guiding observation selection;

guide the user to select observations that (i) can be explained together and (ii) are of interest to the user;

improve performance of a computer implementing an AI planning system as compared to a system using current manual techniques, which are inefficient and result in waste of computing resources due to selection of inappropriate observations followed by multiple unsatisfactory computer runs;

an automated approach to generate many scenarios quickly;

bias removal;

optionally, ready integration with news feeds.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 shows an example of potential issues with current scenario planning;

DETAILED DESCRIPTION

Figure 1:
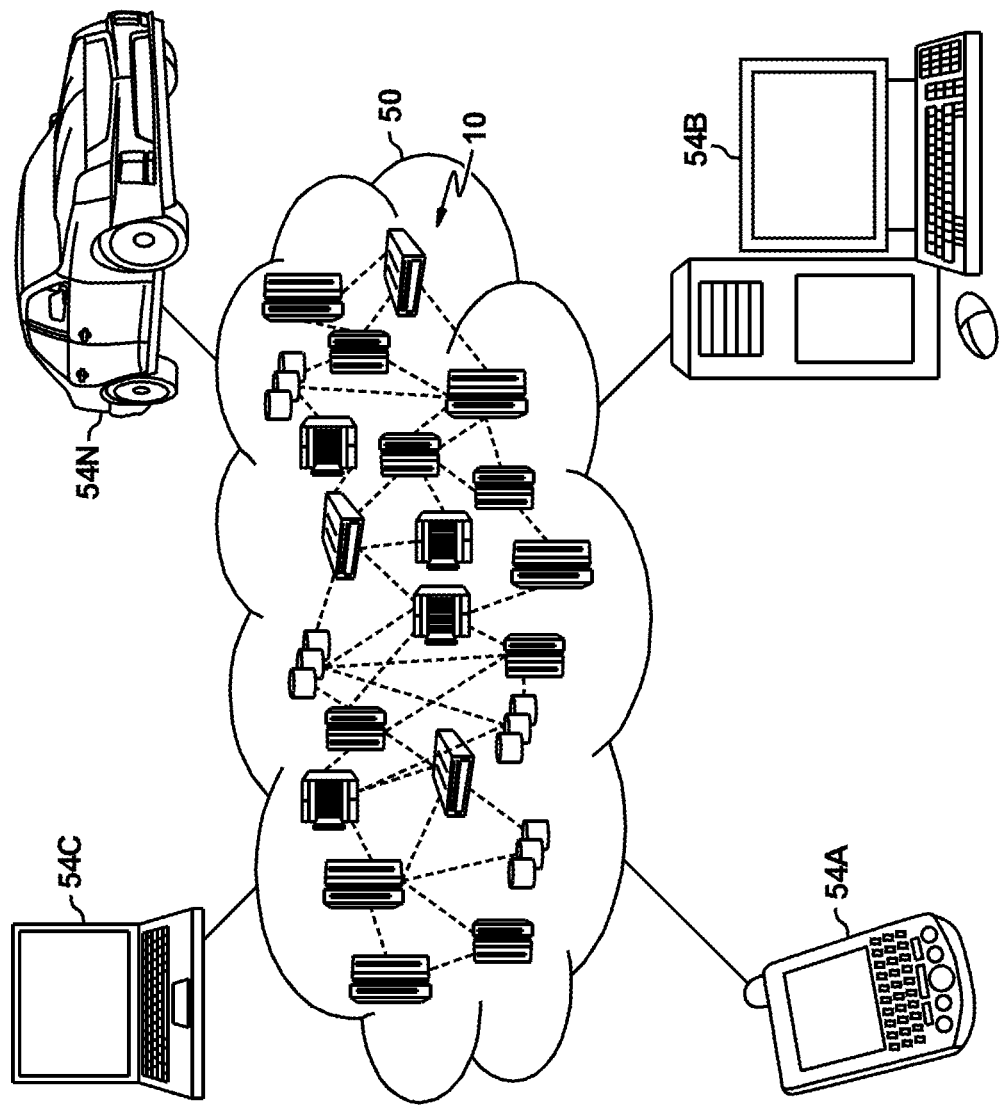
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
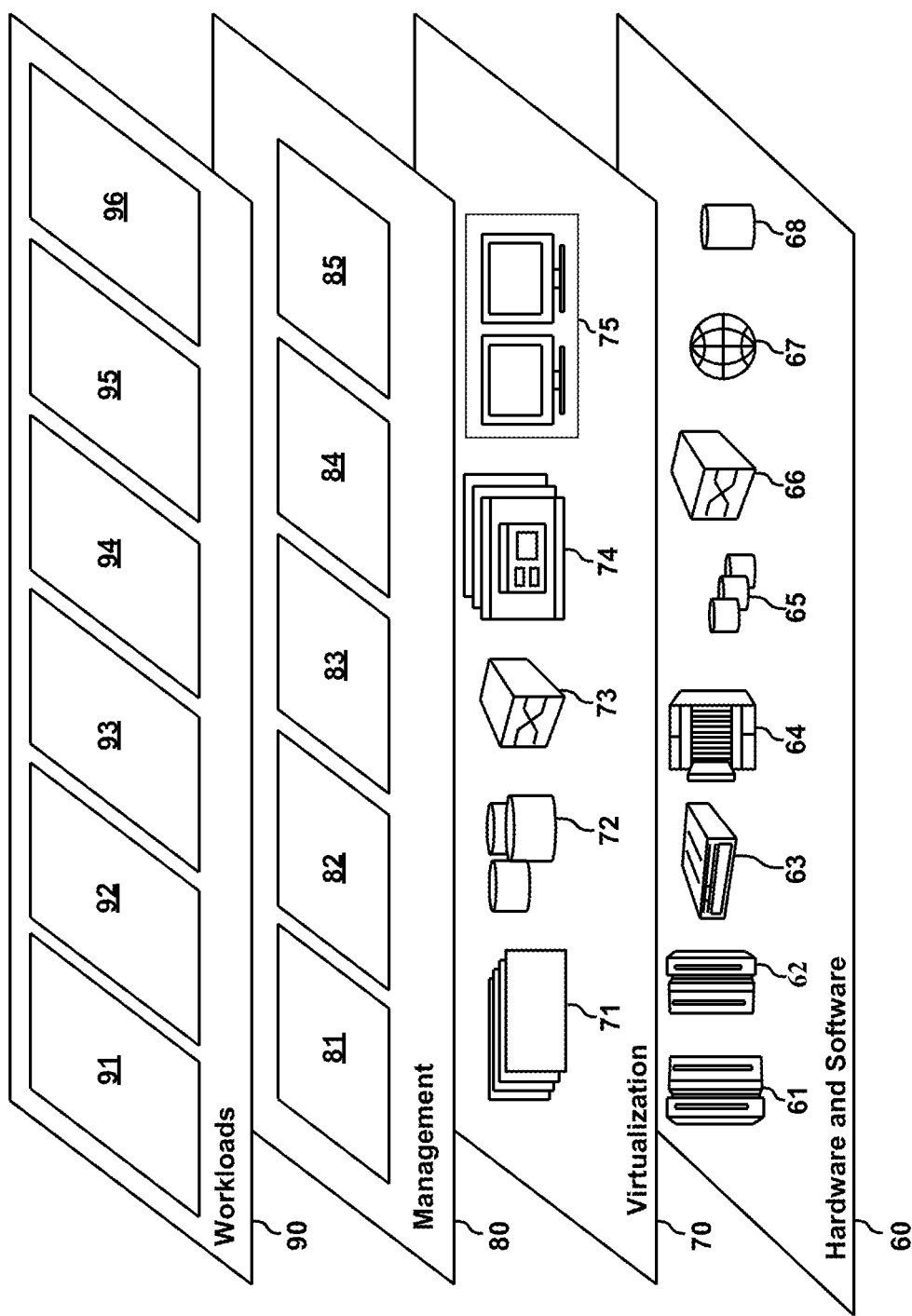
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 for guided plan recognition—for example, useful for determining whether a remote host computer is infected with malware and remediating same and/or for determining patient state of a patient in a healthcare setting and initiating a computerized warning. That is to say, in some embodiments, aspects of the invention or portions thereof can reside in the workload layer in the cloud. For example, some embodiments monitor nodes in the cloud. Indeed, one or more embodiments can be employed to monitor one or more hosts in a cloud environment.

As noted, plan recognition is the problem of recognizing the goals and plans of an agent. It usually involves obtaining as the input the domain description and the set/sequence of observations in order to find out which of the goals or plans are more likely, given the observations.

The observations are often given in sets or sequence(s) and are assumed to be given without providing any guidance to the users. This may result in "unexpected" outcome(s), because the selected observation(s) cannot be explained by the system (e.g., they are inconsistent or incompatible with each other).

Figure 3:
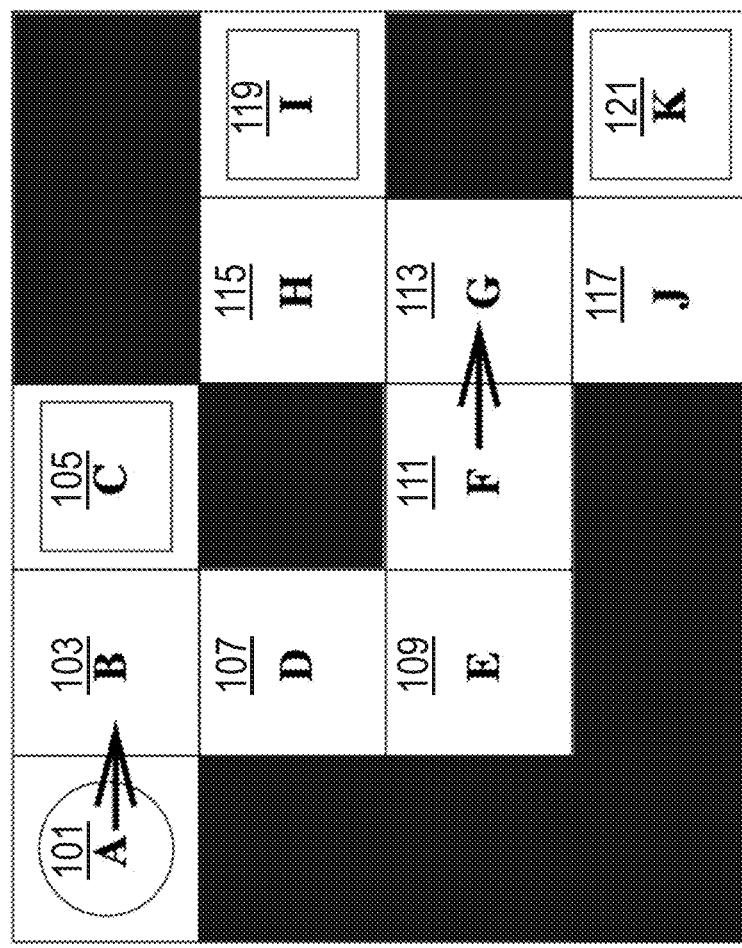
FIG. 3 depicts a simple plan recognition example which can be enhanced using aspects of the invention.

One or more embodiments advantageously provide techniques for guided plan recognition. Referring to FIG. 3, consider an example of plan recognition, wherein it is desired to determine the goals of an agent (human agent and/or software agent). The agent starts from square A, numbered 101, and needs to get to one of squares C, I, or K, numbered, respectively, 105, 119, and 121; which one is not yet known. The agent has a goal in mind but it is not yet known what the goal of the agent is. When the agent is at square A 101, it is not really known which one of squares C, I, or K (105, 119, and 121) the agent is going to. However, when the agent is at square F 111, for instance, it can be assumed that the agent's goal is not square C 105. If the agent wants to go from square G 113 to square J 117 and not to square H 115, then it can be assumed that the agent's goal is square K 121, assuming the rationality of the agent. The agent would have moved to square F 111 by following the path of squares B, D, and E, numbered respectively 103, 107, and 109.

Plan recognition has many applications. Non-limiting examples include malware detection in computer security systems; future state projection; scenario planning for enterprise risk management; and the like. There are many applications that are examples of plan recognition in practice.

In a malware detection example, the objective is to provide assistance to network administrators in detecting malware based on potentially unreliable observations derived from network traffic.

In a healthcare setting, the objective is to help users (nurses, physicians) in the early detection of health complications in the ICU setting (Intensive Care Unit) so as to effectively provide critical care.

In an energy domain example, the objective is to project the price of oil and the volume of oil produced a predetermined number (e.g. fifteen) years into the future.

In a risk management setting, the objective is to assist financial organizations in identifying and managing emerging risks.

There are a number of elements in common across these applications. In particular, there are domain experts who can provide the necessary domain knowledge, although it is challenging to elicit this knowledge. For example, the type of knowledge for the healthcare setting can be provided by doctors, and/or books written on the subject. Similarly, for the energy domain, there may be a significant number of articles regarding the effect of various economic changes on the price of oil. Furthermore, a large number of observations are typically available, which will provide what is often referred to as "situational awareness"—for example, what the current state of the patient is; what could have explained these symptoms; what the current situation is with respect to the risks involved in a particular region. However, there are also challenges as well.

A patient in a typical ICU setting is connected to several monitoring devices that measure different physiological attributes such as the patient's blood pressure, heart rate, and temperature. The analysis of these raw streams of data results in semantically meaningful observations about the patient. For example, given the patient's heart rate, his or her respiration rate and her or his body temperature, which are measured continuously, and also his or her white blood cell count obtained from blood analysis, the Systemic Inflammatory Response Syndrome (SIRS) score (integer that takes values between 0 and 4) can be computed as a meaningful observation about the patient's health. Observations can also include other measurements provided by physicians such as their assessment of patient health or results of lab tests.

Similarly, in network monitoring applications, several raw streams of data are available about individual hosts. For example, there may be on the order of two million hosts. These raw streams of data can include, for example, Domain Name Service (DNS) queries, NetFlow records (the skilled artisan will appreciate that NetFlow is a feature on routers of Cisco Systems, Inc., San Jose, Calif., USA, which provides the ability to collect IP network traffic as it enters or exits an interface), Firewall alerts, Dynamic Host Control Protocol (DHCP) requests, etc. These streams can be analyzed to produce a variety of meaningful observations about host behavior (normal, anomalous, infected) such that hosts behaving suspiciously can be identified in order to protect the network.

Scenario planning for enterprise risk management is a commonly used method that various organizations use to develop their long-term plans. The goal is to explore a number of possible scenarios which could occur. Each scenario can explain at least some of the observations that have been observed, and/or that are anticipated to be observed. For example, provide the user with scenarios that can explain his or her observations. One or more embodiments employ artificial intelligence (AI) to project what could happen in the future under various different possible conditions. Currently, a user chooses specific things of interest to her or him, and then those choices guide the process. However, the selection of the observations by the user is often carried out arbitrarily without the use of specific rules. Scenario planning for risk management puts an added emphasis on identifying the extreme yet possible risks that are not usually considered in daily operations.

In one or more embodiments, scenario planning involves analyzing the relationship between forces such as social, technical, economic, environmental, and political trends in order to explain the current situation in addition to providing insights about the future. A major benefit to scenario planning is that it helps businesses or policy-makers learn about the possible alternative future outcomes and anticipate them. While the expected scenarios are interesting for verification purposes, scenarios that are surprising to the users (e.g., policy-makers in businesses or other fields) are typically the ones that are the most important and significant.

Scenario planning is often helpful because the future cannot be predicted. Scenario planning advantageously provides a method to break the habit of expecting the future to resemble the past and current trends. Furthermore, scenario planning can also provide a vehicle to drive conversations on business insights related to possible emerging risks.

In one or more embodiments, scenario planning (i) provides situational awareness of the relevant risk drivers by detecting emerging storylines, and (ii) automatically generates future scenarios that allow analysts to reason about, and plan for, contingencies and opportunities in the future.

One or more embodiments advantageously guide the user in selecting appropriate observations. In some instances, the problem can be solved many times for different observations, and the user can be shown the next several observations that he or she can choose. In essence, the system determines observations that can be added to the current set of observations to improve the quality of the solution. In one or more embodiments, what is being selected is the observations in the system. See discussion of FIG. 2 below, wherein the user can select observations. With current techniques, it will not be known whether the selected observations can be explained together. Suppose the user selects three or four observations randomly; this is likely to lead to solutions that are not useful. Accordingly, the user will have to make many trials/run multiple iterations before obtaining useful results, thus reducing both user and machine efficiency and requiring expenditure of significant central processing unit (CPU) time as compared to techniques employing aspects of the invention.

A distinction should be made between the drivers and the observations. The drivers are elements to which events could occur, while the observations are actual things that happened or that are expected to happen. The drivers are relevant to planning in general; however, the drivers are not relevant to one or more embodiments. One or more embodiments advantageously help choose observations which create a scenario that can explain the observations. The chance that randomly-chosen observations will produce a scenario that can satisfactorily explain the observations will tend to be low. On the other hand, suppose one (or more) observation(s) are identified as important. One or more embodiments suggest additional observations which will result in a scenario that can satisfactorily explain together the important observation(s) and the suggested additional observations. The user will select one or more of the suggested additional observations; the system, in one or more embodiments, will then suggest yet further observations.

One or more embodiments provide the additional suggested observations by solving the planning problem for many different sets of observations. Thus, one or more embodiments guide the user to select observations that (i) can be explained together and (ii) are of interest to the user.

The selected observations are related to the aspects that it is desired to predict. For example, if desired to predict economic growth, pertinent observations might be monetary stability, governmental stability, and presence of natural resources; as opposed to popular cultural trends in dress or entertainment. Note, however, that in practical problems, the selection of the appropriate observations is often much less clear than in the simple economic growth example just given. Current manual techniques are inefficient and result in waste of computing resources due to selection of inappropriate observations followed by multiple unsatisfactory computer runs.

"Alignment" is the term of art regarding how well the observations are chosen to work together to give a good prediction (or more accurately to explore meaningful possibilities—not necessarily probable that they will happen).

Aspects of the invention can improve the performance of any plan recognition system; one non-limiting example of such a system is IBM Research Scenario Planning Advisor (SPA), which is a decision support system that allows domain experts to generate diverse alternative scenarios of the future and imagine the different possible outcomes, including unlikely but potentially impactful futures. In some instances, SPA provides country chief financial officers (CFOs) with an automated solution to assist in identifying and assessing emerging risks. Embodiments of SPA are designed to continuously monitor multiple real-world sources (e.g., social media, news, blogs, and the like) to identify key driving forces. SPA makes use of advanced analytics, as well as cognitive technology (such as artificial intelligence (AI) planning and/or reasoning). Embodiments of SPA combine human domain knowledge with machine reasoning and planning, to project a wide range of possibilities of scenarios and emerging risks.

One or more embodiments make use of the insight that plan recognition can itself be treated as a planning application. In particular, one or more embodiments consider the relationship between forces; the planning domain including knowledge engineering (KE—how to encode the planning knowledge—one or more embodiments can make use of so-called "mind maps"); key drivers (e.g., observations that can be obtained, for example, from news aggregation); as well as implications (e.g., a set of possible goals). In one or more embodiments, plans are grouped into clusters of plans, which form scenarios (e.g. three to six or another appropriate number). The Mind Maps encode knowledge about risk drivers and business implications elicited from the domain experts. The domain experts use Mind Maps created in Free-Mind, a graphical tool that encodes concepts and relations, to capture directed graphs of risk drivers and business implications, with edges having hidden semantics of pairwise cause and effect.

One or more embodiments advantageously provide an automated approach to generate many scenarios quickly; remove biases; and/or permit integration with the news.

Current techniques provide no guidance on observation selection. Refer to FIG. 4. Suppose it is desired to generate scenarios for a developing country "Country A." The user is provided the opportunity to select one or more key drivers; for example, high inflation 201; ability to better analyze market and consumers 203; allowing a fair playing ground for all firms 205; wider availability of broadband Internet 207; business or supplier disruption 209; businesses struggling to conform to regulations 211; businesses struggling to keep up with client's demands 213; calls for new social programs 215; and capital controls (e.g. due to currency volatility) 217.

The random, unguided selection of drivers may result in an "unexpected" outcome, because the selected observation(s) cannot be explained by the system (e.g., they are inconsistent or incompatible with each other).

One or more embodiments advantageously provide guidance regarding observation selection in the context of plan recognition. There are at least two places this can be done:

When the raw data is analyzed and transformed to observations (e.g., matching of stories to observations, and subsequent selection of observations);

When the observation sequence is provided to the system.

In one or more embodiments, the categories of observations can be shown using a variety of techniques, as will be apparent to the skilled artisan, given the teachings herein; one or more non-limiting examples employ various colors and/or different boxes. For example:

Green: next set of observations that are perfectly aligned with the already-selected observations ("definitely add");

Yellow: next set of observations that are partially aligned (some inconsistency exists) with the already-selected observations ("possibly add");

Red: the next set of observations that should be avoided (they create significant inconsistency and are not within the context of the previous selected observation set) ("definitely do not add").

Hence, in one or more embodiments, users are guided through the observation selection process. Some embodiments use techniques disclosed herein from the start; in other embodiments, users start using techniques disclosed herein after they have an already existing selection of observations.

Figure 5:
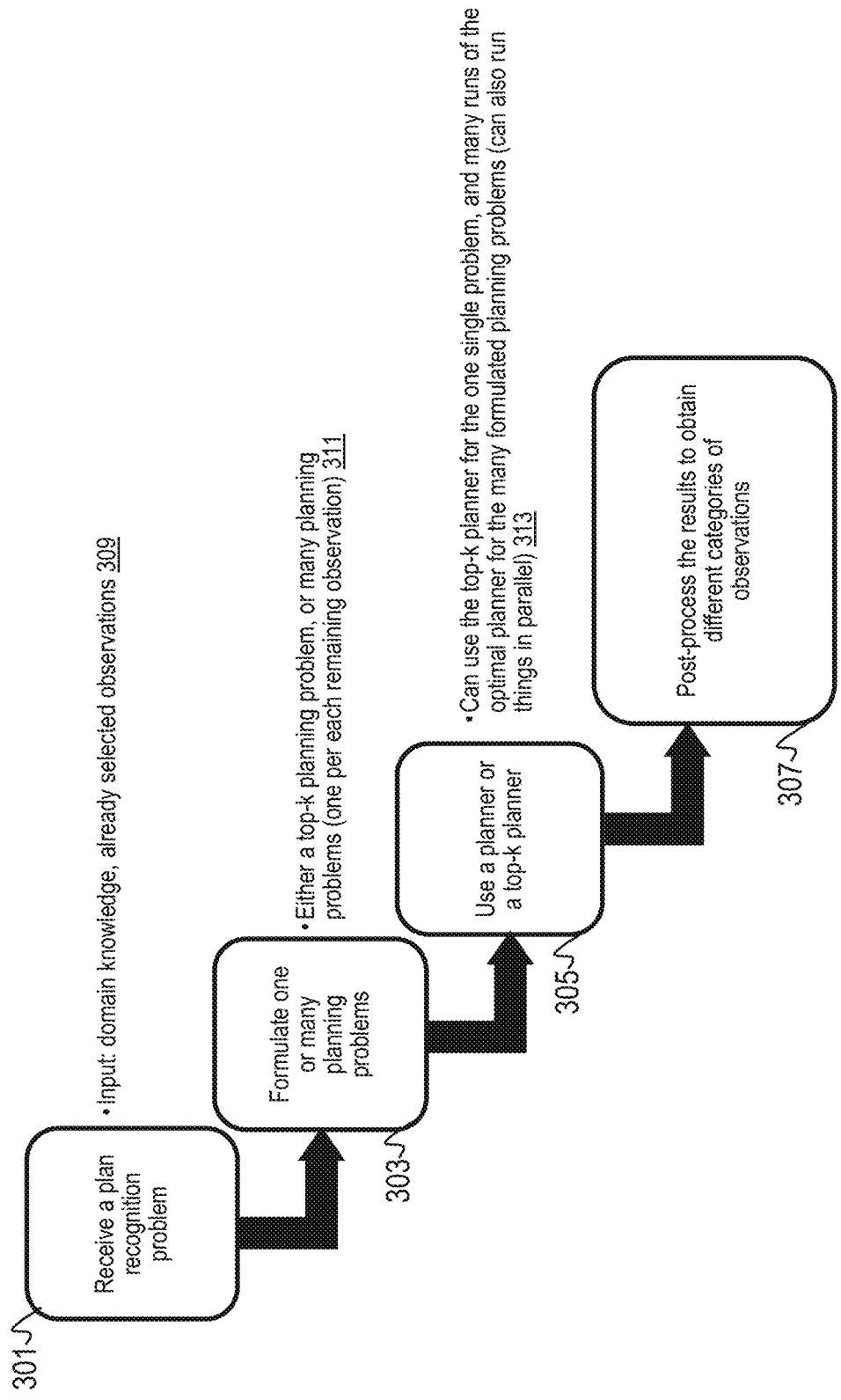
FIG. 5 is a flow chart, according to an aspect of the invention.

Refer now to FIG. 5. There are several ways to implement aspects of the invention. Some embodiments find multiple solutions to one planning problem to find the next iteration that it is desired to be able to plan together. The problem can be cast as one planning problem with multiple solutions, or can be cast as one planning problem per observation. In the former case, for example, use a top-K planner and run the planner once; while in the latter case, for example, use an optimal planner and run it multiple times. The solutions can then be post-processed to find observations that worked well (i.e. find observations that provided better solutions). In essence, try an observation, run a planner to obtain a solution, see whether the solution is good or bad. Then iterate—in each step, give the user a choice of observations, let the user make a choice, then run the next set of problems, to determine the next observations to recommend.

Consider a first case wherein the user has already used a tool in accordance with one or more embodiments.

In a first solution applicable in such a first case, formulate one planning problem for each observation that is left (i.e. not selected so far) such that the best solution to the planning problem will indicate if this particular observation is consistent with the rest of the observations or not.

In a second solution applicable in such a first case, formulate one planning problem whose set of best solutions will indicate which of the observations are consistent with the rest of the observations. Since the user used a tool in accordance with one or more embodiments, it can be safely assumed that the current set of selected observations are consistent (all can be explained).

The previous runs of the system can be used to further refine and sort the results. For example, a system employing aspects of the invention could be utilized by multiple users; problem(s) already solved for "User A" could be employed in later solving the same or similar problem(s) for "User B." For example, if a certain country is to be analyzed, drivers and/or observations known from previous analyses to often occur together could be used to sort or rank recommendations.

Now consider a second case wherein the user has a set of observations in mind and has just started using a tool in accordance with one or more embodiments for guidance.

In a first solution applicable in such a second case, just as above, formulate one planning problem for each observation that is left (i.e. not selected so far) such that the best solution to the planning problem will indicate if this particular observation is consistent with the rest of the observations or not.

A second solution applicable in such a second case, will be somewhat similar to the second solution applicable in the first case, in that one planning problem is formulated. However, it cannot be assumed that the existing set of observations are consistent, so all cases should be considered. At this point, obtain extra information from the users in order to understand which of the already-selected observations are or are not consistent.

Similar to the first case, other techniques can be used to further enhance and refine the results, as discussed above.

Referring to FIG. 5, one or more embodiments advantageously provide techniques to automatically provide guidance on observation selection in a plan recognition setting, wherein a plan recognition problem is received at 301; as indicated at 309, the input problem includes domain knowledge, and a set of already-selected observations. In step 303, a planning problem (or multiple planning problems) is/are formulated. For example, as indicated at 311, a top-K planning problem is formulated, or many planning problems are formulated (one per each remaining observation). In step 305, a planner is run to obtain the results. As indicated at 313, the top-k planner can be used for the single problem; and many runs of an optimal planner can be used for the many formulated planning problems. Parallelism can also be employed in some instances; i.e., in approaches that solve multiple planning problems, one or more embodiments solve the multiple problems in parallel.

As indicated at 307, in one or more embodiments, the generated plans are post processed in such a way as to provide guidance on observation selection. For example, order/rank the generated plans by cost and apply at least one cost threshold to determine which observations should be recommended. In a non-limiting example, apply two thresholds; plans with a cost at or below the lower threshold fall in the "green" category discussed above; plans with a cost at or above the upper threshold fall in the "red" category discussed above; and plans with a cost between the lower and upper thresholds fall in the "yellow" category discussed above. The threshold(s) will, in general, be domain-dependent and the skilled artisan, given the teachings herein, will be able to select appropriate thresholds.

In some instances, the observations are empty to begin with; i.e., no observations have been selected yet.

In one or more embodiments, top-k planning is used where quality is measured by cost (in one or more embodiments, cost is domain-dependent as will be apparent to the skilled artisan given the teachings herein and is not necessarily monetary; for example, cost could be measured in CPU time and/or other amount of computing resources).

In some instances, other techniques are used rather than, or in combination with, planning—such as learning from experience.

In one or more embodiments, optimization is carried out when the user has used a system and/or tool in accordance with aspects of the invention from the beginning (the tool can be relied on to reduce the complexity).

One or more embodiments advantageously directly enable a new, improved, scenario planning process.

One or more embodiments relate to Scenario Planning, Plan Recognition, AI Planning, and/or Plan Recognition as Planning.

One or more embodiments address the problem of providing guidance on observation selection in a plan recognition setting (e.g. using AI planning). One or more embodiments do not assume plan libraries are given and instead obtain the domain theory as the input of the plan recognition problem. In certain prior art techniques, the observations are assumed to be over the actions, whereas one or more embodiments can handle both observations over the state of the world as well as the observations over actions. Indeed, one or more embodiments advantageously address the problem of observations guidance by a transformation of the plan recognition problem to AI planning and computing plans.

Figure 6:
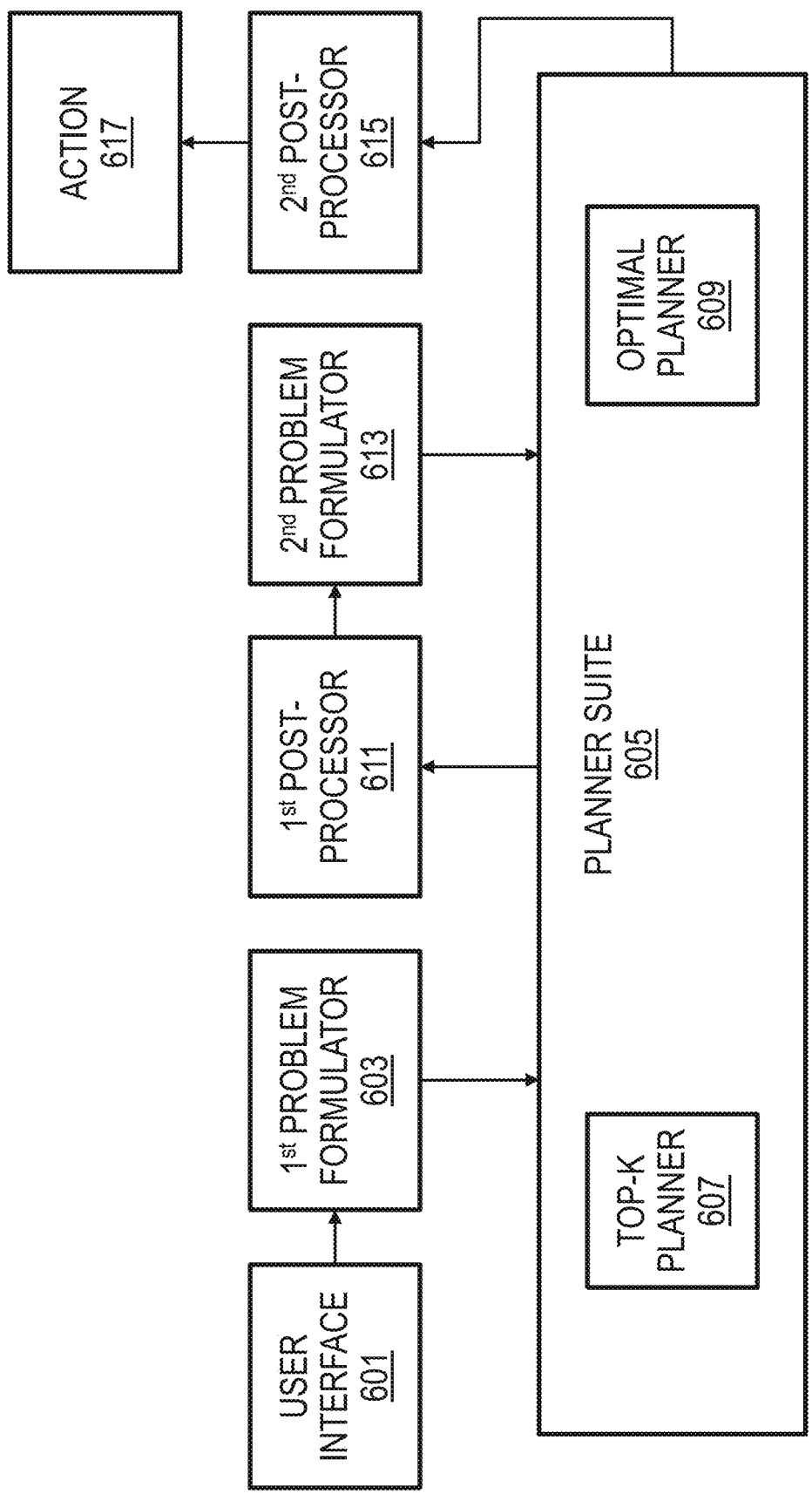
FIG. 6 is a block diagram, according to an aspect of the invention.

Referring now to FIG. 6, an exemplary tool, according to an aspect of the invention, includes a user interface 601; a first problem reformulator 603; and a planner suite 605 including one or more top-k planners 607 and/or one or more optimal planners 609. Also included are a first post-processor 611, a second problem formulator 613, and a second post-processor 615. The first problem reformulator 603 formulates the plan recognition problem as one or more planning problems, as described elsewhere herein. The first post-processor 611 orders/ranks the generated plans by cost and applies at least one cost threshold, as described elsewhere herein. The second problem formulator 613, planner suite 605, and second post processor 615 cooperatively solve the plan recognition problem using the one or more recommended candidate observations. The skilled artisan is familiar with problem formulation to formulate a plan recognition problem as a planning problem, use of a planner suite, and post processing to solve a plan recognition problem from, for example, RIABOV; Anton Viktorovich; et al., co-assigned US Patent Application Publication 2017-0147923, PLAN RECOGNITION WITH UNRELIABLE OBSERVATIONS, May 25, 2017, and will be able to implement elements 613 and 615. The second post processor 615 initiates one or more suitable actions 617 such as radiating an infected host or warning a health care provider.

Given the discussion thus far, it will be appreciated that, in general terms, an exemplary method for improving the performance of a computer (see, e.g., FIG. 7 and accompanying text) running a plan recognition application, according to an aspect of the invention, includes obtaining (e.g. step 301), with a user interface 601 implemented on the computer, a specification of a plan recognition problem, including a plurality of candidate observations. The method further includes (e.g. step 303) formulating at least one planning problem, with the computer (e.g. with first problem formulator 603), based on the specification. See above discussions of treating the plan recognition problem as a planning problem. A further step 305 includes solving the at least one planning problem, with the computer (e.g. with planner suite 605), to determine at least one plan. The top-K planner 607 or optimal planner 609 are used, depending on whether the problem has been formulated as a single problem or many problems, as described elsewhere herein. A still further step 307 includes post-processing the at least one plan, with the computer (e.g. with first post processor 611), to determine at least one of the candidate observations which should be selected to solve the plan recognition problem. Yet a further step includes solving the plan recognition problem, with the computer, using the at least one of the candidate observations which should be selected to solve the plan recognition problem. For example, use the second problem formulator 613 to formulate the plan recognition problem and solve it using planner suite 605, based at least in part on the selected recommended observations; the use second post-processor 615 to collate and present the results.

In one or more embodiments, a further step includes obtaining an affirmative selection of one or more of the candidate observations which should be selected to solve the plan recognition problem (e.g. from a human user via interface 601, from a software agent via a network interface 20 (discussed below), application programming interface (API), or the like).

In some instances, the formulating step includes formulating the at least one planning problem as a plurality of planning problems, one for each of the candidate observations.

In some such instances, there are no selected observations prior to the formulating step, and solving the at least one planning problem includes solving each of the plurality of planning problems using an optimal planner 609. For example, the user has used the tool for recommending observations from the very beginning, and did not select any observations without the tool.

In other such instances, there is at least one selected observation prior to the formulating step, and wherein solving the at least one planning problem includes solving each of the plurality of planning problems using an optimal planner 609. For example, in this aspect, the user did not use the tool from the very beginning, and selected at least one observation without use of embodiments of the recommendation tool disclosed herein.

On the other hand, in alternative instances, the formulating step includes formulating the at least one planning problem as a single planning problem, considering all of the candidate observations, with a set of best solutions.

In some such alternative instances, there are no selected observations prior to the formulating step, and solving the at least one planning problem includes solving using a top-K planner. For example, the user has used the tool for recommending observations from the very beginning, and did not select any observations without the tool.

In other such alternative instances, there is at least one selected observation prior to the formulating step, and a further step includes obtaining supplemental user information to determine consistency of the at least one selected observation with selected ones of the candidate observations; solving the at least one planning problem includes solving using a top-K planner. For example, in this aspect, the user did not use the tool from the very beginning, and selected at least one observation without use of embodiments of the recommendation tool disclosed herein.

In one or more embodiments, a plurality of possible observations ca be recommended to the user. That is to say, in one or more embodiments, solving of the at least one planning problem to determine the at least one plan includes solving the at least one planning problem to determine a plurality of plans. In such embodiments, the post-processing of the at least one plan to determine the at least one of the candidate observations which should be selected to solve the plan recognition problem includes post-processing the plurality of plans. The post-processing of the plurality of plans in turn includes ranking the plurality of plans by cost; and applying at least one cost threshold such that one or more of the plans with costs at or below the at least one cost threshold correspond to the at least one of the candidate observations which should be selected to solve the plan recognition problem.

Some embodiments (see green-yellow-red example above) use multiple thresholds. That is to say, in one or more embodiments, solving of the at least one planning problem to determine the at least one plan includes solving the at least one planning problem to determine a plurality of plans. In such embodiments, the post-processing of the at least one plan to determine the at least one of the candidate observations which should be selected to solve the plan recognition problem includes post-processing the plurality of plans. The post-processing of the plurality of plans in turn includes ranking the plurality of plans by cost; and applying at least upper and lower cost thresholds such that one or more of the plans with costs at or below the lower cost threshold correspond to the at least one of the candidate observations which should be selected to solve the plan recognition problem ("green"), one or more of the plans with costs at or above the upper cost threshold do not correspond to the at least one of the candidate observations which should be selected to solve the plan recognition problem ("red"); and observations corresponding to one or more of the plans with costs between the lower and upper thresholds are flagged for optional inclusion by an agent (human and/or software) in the at least one of the candidate observations which should be selected to solve the plan recognition problem ("yellow").

There are many potential applications for one or more embodiments. One or more embodiments can be advantageously applied in the cybersecurity field; for example, to the detection and remediation of hosts infected with malware. It is known to use AI planning to provide assistance to network administrators in detecting malware based on unreliable observations derived from network traffic. See, e.g., Shirin Sohrabi et al., Hypothesis Exploration for Malware Detection using Planning, Proceedings of the Twenty-Seventh AAAI Conference on Artificial Intelligence, 2013, Association for the Advancement of Artificial Intelligence, pages 883-889, as well as Riabov; Anton V. et al., Predictive Hypothesis Exploration Using Planning, co-assigned US Patent Publication 2015-0339580, Nov. 26, 2015. Thus, in some cases, the plan recognition problem includes determining whether a remote host computer is infected with malware; and solving the plan recognition problem includes determining that the remote host computer is infected with the malware. A further step then includes initiating at least one remediation action with respect to the remote host computer, based on the solving. For example, a service 96 provided in workloads layer 90 examines network traffic/behavior from a remote host (e.g. remote node 10 in cloud 50).

Non-limiting examples of remedial actions include blocking network traffic from the identified one of the plurality of hosts (for example, using a firewall). In some instances, this can be done in response to first monitoring network traffic from the identified one of the plurality of hosts, and then blocking the traffic when an anomaly is verified. In another aspect, the at least one remedial action includes scanning the identified one of the plurality of hosts for malware and removing or quarantining discovered malware thereon; this aspect is generally feasible if the identified host is under the control of the entity that is detecting the infected host condition, or at least has some relationship with such entity. Service 96 can be implemented directly or virtually on one or more computing nodes 10 which can send instructions over network adapter 20 to cause a firewall to block traffic and/or cause a remote security agent to scan the potentially infected host.

One or more embodiments can be advantageously applied in the healthcare field; for example, in one or more embodiments, the plan recognition problem includes determining patient state of a patient in a healthcare setting. See, e.g., co-assigned US Patent Publication 2015-0339580, mentioned above. A non-limiting example of patient state, pertinent in an emergency room/acutely hospitalized situation, is the Systemic Inflammatory Response Syndrome (SIRS) factor. Sepsis is a systemic inflammatory response to a confirmed or suspected infection. Clinically, the Systemic Inflammatory Response Syndrome (SIRS) is the occurrence of at least two of the following criteria: fever>38.0° C. or hypothermia<36.0° C., tachycardia>90 beats/minute, tachypnea>20 breaths/minute, leucocytosis>$12*10^9$/l or leucopoenia<$4*10^9$/l. The SIRS factor is a non-limiting example of an observation.

In one or more healthcare embodiments, solving the plan recognition problem includes determining that the patient state of the patient in the healthcare setting is of concern (e.g. two or more SIRS factors present), and a further step includes initiating at least one computerized warning, based on the solving. For example, trigger a patient alarm to summon a healthcare provider to the patient's bedside. For example, one or more computing nodes 10 solving the healthcare problem can send instructions over network adapter 20 to cause summon a provider and/or sound an alarm.

One or more embodiments are directed to a computer running a plan recognition application, discussed immediately below with regard to FIG. 7, including a memory 28; at least one processor 16, coupled to the memory, and a non-transitory computer readable medium including computer executable instructions which when loaded into the memory configure the at least one processor to be operative to perform a method (generally, carry out or otherwise facilitate) for improving the performance of the computer, including any one, some, or all of the method steps described herein. For example, the non-transitory computer readable medium could be the storage system 34 storing program/utility 40, having a set (at least one) of program modules 42, while the instructions could, for example, be loaded into RAM 30 and/or memory on processor 16.

In some instances, the computer executable instructions, when loaded into the memory, configure the at least one processor to implement the user interface, a first problem formulator, a first post processor, a second problem formulator, a second post processor, and a planner suite, as illustrated in FIG. 6. For example, the formulating of the at least one planning problem is carried out with the first problem formulator 603; the solving of the at least one planning problem is carried out with the planner suite 605; the post-processing of the at least one plan is carried out with the first post processor 611; and the solving of the plan recognition problem, using the at least one of the candidate observations which should be selected to solve the plan recognition problem, is cooperatively carried out by the second problem formulator 613, the planner suite 605, and the second post processor 615.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 7:
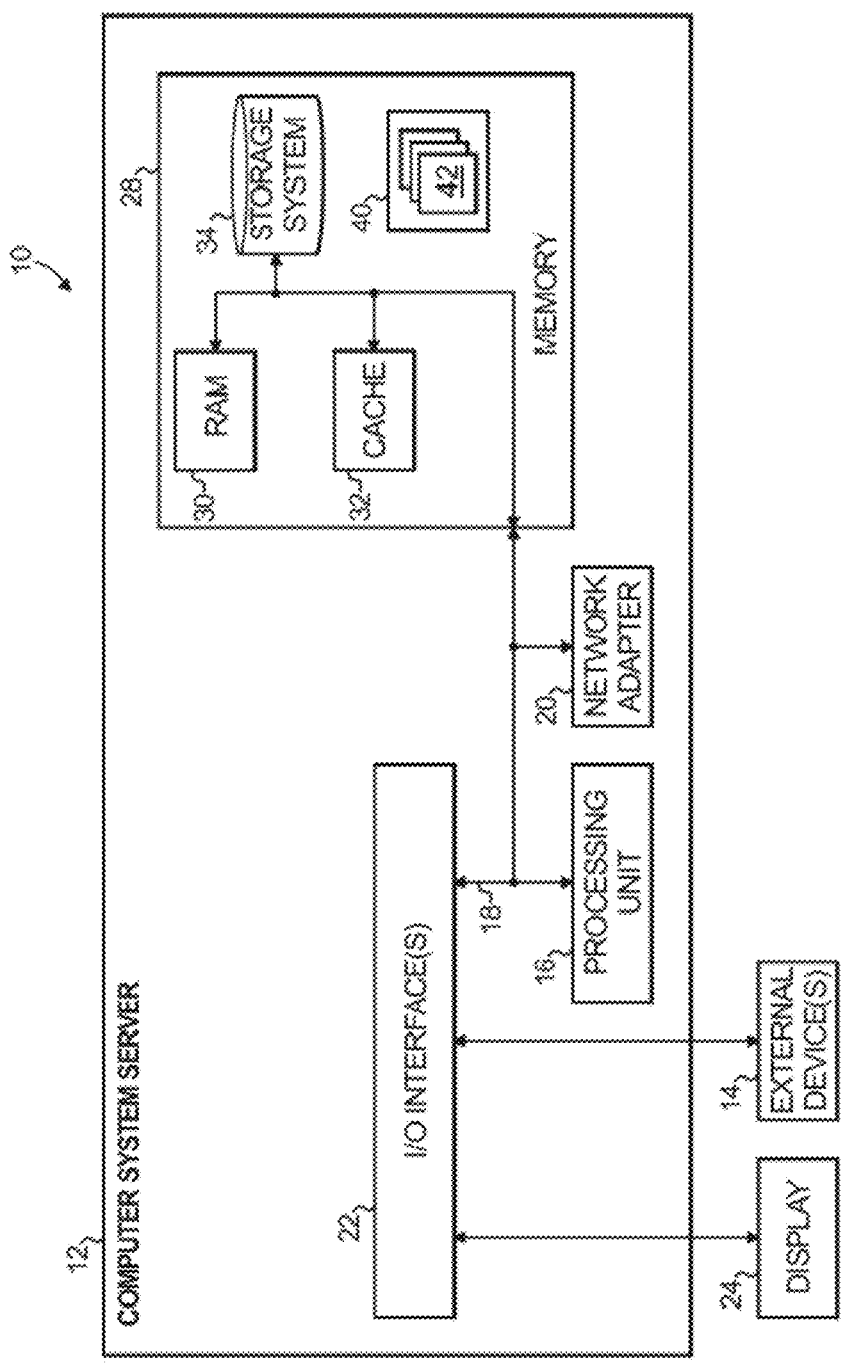
FIG. 7 depicts a computer system that may be useful in implementing one or more aspects and/or elements of the invention.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a service/application 96 in layer 90 as described herein.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described with respect to FIG. 6. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface 601 that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing use of computing resources by a computer running a plan recognition application for malware detection, said method comprising:

obtaining, with a user interface implemented on said computer, a specification of a plan recognition problem, including a plurality of candidate observations, wherein said plan recognition problem comprises determining whether a remote host computer is infected with malware;

formulating at least one planning problem, with said computer, based on said specification;

solving said at least one planning problem, with said computer, to determine a plurality of plans;

forming groups of observations by post-processing said plurality of plans, with said computer, to determine a group of said candidate observations which should be selected to solve said plan recognition problem for reduced use of computing resources, wherein said groups of observations comprise a first group that is perfectly aligned with previously selected observations, a second group that is not perfectly aligned with previously selected observations, and a third group that is not within context of previously selected observations, wherein said post-processing of said plurality of plans comprises ranking said plurality of plans by cost, and applying at least upper and lower cost thresholds such that one or more of said plans with costs at or below said lower cost threshold correspond to said at least one of said candidate observations which should be selected to solve said plan recognition problem, one or more of said plans with costs at or above said upper cost threshold do not correspond to said at least one of said candidate observations which should be selected to solve said plan recognition problem, and observations corresponding to one or more of said plans with costs between said lower and upper thresholds are flagged for optional inclusion by an agent in said group of said candidate observations which should be selected to solve said plan recognition problem;

responsive to obtaining an indication of said optional inclusion, including flagged ones of said observations corresponding to said one or more of said plans with said costs between said lower and upper thresholds in said group of said candidate observations which should be selected to solve said plan recognition problem;

solving said plan recognition problem, with said computer, using said group of said candidate observations which should be selected to solve said plan recognition problem, including said flagged ones of said observations corresponding to said one or more of said plans with said costs between said lower and upper thresholds, wherein solving said plan recognition problem comprises determining that said remote host computer is infected with said malware; and initiating at least one remediation action with respect to said remote host computer, based on said solving, wherein said remediation action is selected from a list consisting of: blocking network traffic and scanning an identified host for malware.

2. The method of claim 1, wherein said formulating step comprises formulating said at least one planning problem as a plurality of planning problems, one for each of said candidate observations.

3. The method of claim 2, wherein there are no selected observations prior to said formulating step, and wherein solving said at least one planning problem comprises solving each of said plurality of planning problems using an optimal planner.

4. The method of claim 2, wherein there is at least one selected observation prior to said formulating step, and wherein solving said at least one planning problem comprises solving each of said plurality of planning problems using an optimal planner.

5. The method of claim 1, wherein said formulating step comprises formulating said at least one planning problem as a single planning problem, considering all of said candidate observations, with a set of best solutions.

6. The method of claim 5, wherein there are no selected observations prior to said formulating step, and wherein solving said at least one planning problem comprises solving using a top-K planner.

7. The method of claim 5, wherein there is at least one selected observation prior to said formulating step, further comprising obtaining supplemental user information to determine consistency of said at least one selected observation with selected ones of said candidate observations, and wherein solving said at least one planning problem comprises solving using a top-K planner.

8. A non-transitory computer readable medium comprising computer executable instructions which when executed by a computer running a plan recognition application for malware detection cause the computer to perform a method for reducing use of computing resources, the method comprising:
   obtaining, with a user interface implemented on said computer, a specification of a plan recognition problem, including a plurality of candidate observations, wherein said plan recognition problem comprises determining whether a remote host computer is infected with malware;
   formulating at least one planning problem, with said computer, based on said specification;
   solving said at least one planning problem, with said computer, to determine a plurality of plans;
   forming groups of observations by post-processing said plurality of plans, with said computer, to determine a group of said candidate observations which should be selected to solve said plan recognition problem for reduced use of computing resources, wherein said groups of observations comprise a first group that is perfectly aligned with previously selected observations, a second group that is not perfectly aligned with previously selected observations, and a third group that is not within context of previously selected observations, wherein said post-processing of said plurality of plans comprises ranking said plurality of plans by cost, and applying at least upper and lower cost thresholds such that one or more of said plans with costs at or below said lower cost threshold correspond to said at least one of said candidate observations which should be selected to solve said plan recognition problem, one or more of said plans with costs at or above said upper cost threshold do not correspond to said at least one of said candidate observations which should be selected to solve said plan recognition problem, and observations corresponding to one or more of said plans with costs between said lower and upper thresholds are flagged for optional inclusion by an agent in said group of said candidate observations which should be selected to solve said plan recognition problem;
   responsive to obtaining an indication of said optional inclusion, including flagged ones of said observations corresponding to said one or more of said plans with said costs between said lower and upper thresholds in said group of said candidate observations which should be selected to solve said plan recognition problem;
   solving said plan recognition problem, with said computer, using said group of said candidate observations which should be selected to solve said plan recognition problem, including said flagged ones of said observations corresponding to said one or more of said plans with said costs between said lower and upper thresholds, wherein solving said plan recognition problem comprises determining that said remote host computer is infected with said malware; and
   initiating at least one remediation action with respect to said remote host computer, based on said solving, wherein said remediation action is selected from a list consisting of: blocking network traffic and scanning an identified host for malware.

9. The medium of claim 8, wherein said formulating comprises formulating said at least one planning problem as a plurality of planning problems, one for each of said candidate observations, and wherein solving said at least one planning problem comprises solving each of said plurality of planning problems using an optimal planner.

10. The medium of claim 8, wherein said formulating step comprises formulating said at least one planning problem as a single planning problem, considering all of said candidate observations, with a set of best solutions, and wherein solving said at least one planning problem comprises solving using a top-K planner.

11. A computer running a plan recognition application for malware detection, the computer comprising:
   a memory;
   at least one processor, coupled to said memory; and
   a non-transitory computer readable medium comprising computer executable instructions which when loaded into said memory configure said at least one processor to be operative to perform a method for reducing use of computing resources, the method comprising:
      obtaining, with a user interface implemented on said computer, a specification of a plan recognition problem, including a plurality of candidate observations, wherein said plan recognition problem comprises determining whether a remote host computer is infected with malware;
      formulating at least one planning problem, with said computer, based on said specification;
      solving said at least one planning problem, with said computer, to determine a plurality of plans;
      forming groups of observations by post-processing said plurality of plans, with said computer, to determine a group of said candidate observations which should be selected to solve said plan recognition problem for reduced use of computing resources, wherein said post-processing of said plurality of plans comprises ranking said plurality of plans by cost, and applying at least upper and lower cost thresholds such that one or more of said plans with costs at or below said lower cost threshold correspond to said group of said candidate observations which should be selected to solve said plan recognition problem, one or more of said plans with costs at or above said upper cost threshold do not correspond to said group of said candidate observations which should be selected to solve said plan recognition problem, and observations corresponding to one or more of said plans with costs between said lower and upper thresholds are flagged for optional inclusion by an agent in said group of said candidate observations which should be selected to solve said plan recognition problem;

responsive to obtaining an indication of said optional inclusion, including flagged ones of said observations corresponding to said one or more of said plans with said costs between said lower and upper thresholds in said group of said candidate observations which should be selected to solve said plan recognition problem;

solving said plan recognition problem, with said computer, using said group of said candidate observations which should be selected to solve said plan recognition problem, including said flagged ones of said observations corresponding to said one or more of said plans with said costs between said lower and upper thresholds, wherein solving said plan recognition problem comprises determining that said remote host computer is infected with said malware; and initiating at least one remediation action with respect to said remote host computer, based on said solving.

12. The computer of claim 11, wherein said computer executable instructions, when loaded into said memory, configure said at least one processor to implement said user interface, a first problem formulator, a first post processor, a second problem formulator, a second post processor, and a planner suite, wherein:

said formulating of said at least one planning problem is carried out with said first problem formulator;

said solving of said at least one planning problem is carried out with said planner suite;

said post-processing of said at least one plan is carried out with said first post processor; and said solving of said plan recognition problem, using said at least one of said candidate observations which should be selected to solve said plan recognition problem, is cooperatively carried out by said second problem formulator, said planner suite, and said second post processor.

13. The computer of claim 12, wherein said planning suite comprises an optimal planner, wherein said formulating comprises formulating said at least one planning problem as a plurality of planning problems, one for each of said candidate observations, and wherein solving said at least one planning problem comprises solving each of said plurality of planning problems using an optimal planner.

14. The computer of claim 12, wherein said planning suite comprises a top-K planner, wherein said formulating step comprises formulating said at least one planning problem as a single planning problem, considering all of said candidate observations, with a set of best solutions, and wherein solving said at least one planning problem comprises solving using said top-K planner.

15. The computer of claim 11, wherein said method further comprises:

presenting said first, second, and third groups of observations to a user via an interface that codes said first group of observations as "green," codes said second group of observations as "yellow," and codes said third group of observations as "red"; and receiving from said user, via said interface, a selection of a "green" or "yellow" observation.

* * * * *